(12) United States Patent
Nakagawara

(10) Patent No.: US 9,191,569 B2
(45) Date of Patent: Nov. 17, 2015

(54) IMAGING APPARATUS HAVING OBJECT DETECTION FUNCTION AND METHOD FOR CONTROLLING IMAGING APPARATUS

(75) Inventor: Naoyuki Nakagawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 417 days.

(21) Appl. No.: 13/532,408

(22) Filed: Jun. 25, 2012

(65) Prior Publication Data

US 2013/0002884 A1 Jan. 3, 2013

(30) Foreign Application Priority Data

Jun. 30, 2011 (JP) ................................. 2011-145933
May 10, 2012 (JP) ................................. 2012-108679

(51) Int. Cl.
| | | |
|---|---|---|
| *H04N 5/225* | (2006.01) | |
| *H04N 5/232* | (2006.01) | |
| *H04N 5/235* | (2006.01) | |
| *G03B 7/099* | (2014.01) | |
| *G03B 17/20* | (2006.01) | |

(52) U.S. Cl.
CPC ......... *H04N 5/23219* (2013.01); *H04N 5/2351* (2013.01); *H04N 5/23212* (2013.01); *G03B 7/099* (2013.01); *G03B 17/20* (2013.01)

(58) Field of Classification Search
CPC .............. H04N 5/232; H04N 5/23212; H04N 5/23219; H04N 5/2351; G03B 17/20; G03B 7/099
USPC .......................................................... 348/169
See application file for complete search history.

(56) References Cited

U.S. PATENT DOCUMENTS

| | | | | |
|---|---|---|---|---|
| 4,929,824 A | * | 5/1990 | Miyazaki ...................... | 382/274 |
| 7,660,519 B2 | * | 2/2010 | Iwane et al. ................... | 396/123 |
| 8,121,469 B2 | * | 2/2012 | Yata ................................ | 396/95 |
| 8,189,090 B2 | * | 5/2012 | Sasaki ........................... | 348/345 |
| 8,305,481 B2 | * | 11/2012 | Takada et al. .................. | 348/345 |
| 8,817,122 B2 | * | 8/2014 | Okamura .................... | 348/222.1 |
| 2005/0168621 A1 | * | 8/2005 | Kageyama et al. ........... | 348/349 |
| 2008/0080739 A1 | * | 4/2008 | Muramatsu .................... | 382/103 |
| 2008/0136958 A1 | * | 6/2008 | Nakahara ...................... | 348/345 |
| 2009/0010549 A1 | * | 1/2009 | Muramatsu .................... | 382/209 |
| 2009/0153666 A1 | * | 6/2009 | Takeuchi et al. .............. | 348/169 |
| 2010/0040356 A1 | * | 2/2010 | Ishikawa ....................... | 396/124 |

(Continued)

FOREIGN PATENT DOCUMENTS

| | | |
|---|---|---|
| CN | 101620360 A | 1/2010 |
| JP | 2008-5110 A | 1/2008 |
| JP | 2010-96963 A | 4/2010 |

*Primary Examiner* — Jay Patel
*Assistant Examiner* — Francis G Geroleo
(74) *Attorney, Agent, or Firm* — Canon USA, Inc., IP Division

(57) ABSTRACT

An imaging apparatus having a function of detecting a face from an image signal on which a focusing frame is superimposed is configured so that a face selected to be a main object can continue being selected to be a main object even if a focusing frame is displayed as superimposed on the face. A central processing unit moves a position of a focusing frame to be displayed by a display unit to a position corresponding to a detected object if a ratio of a size of the detected object to a size of the focusing frame displayed on the display unit is greater than or equal to a predetermined threshold, and does not move the position of the focusing frame to be displayed by the display unit to a position corresponding to the detected object if the ratio is less than the threshold.

7 Claims, 12 Drawing Sheets

(56) References Cited

U.S. PATENT DOCUMENTS

| | | | |
|---|---|---|---|
| 2010/0045800 A1* | 2/2010 | Chebil et al. | 348/169 |
| 2010/0098397 A1* | 4/2010 | Yata | 396/124 |
| 2011/0019066 A1* | 1/2011 | Takano et al. | 348/345 |
| 2011/0200315 A1* | 8/2011 | Maeda | 396/124 |
| 2011/0292276 A1* | 12/2011 | Terashima | 348/348 |
| 2012/0002849 A1* | 1/2012 | Tokuse | 382/118 |
| 2012/0098992 A1* | 4/2012 | Hosoe | 348/222.1 |

\* cited by examiner

FIG. 3
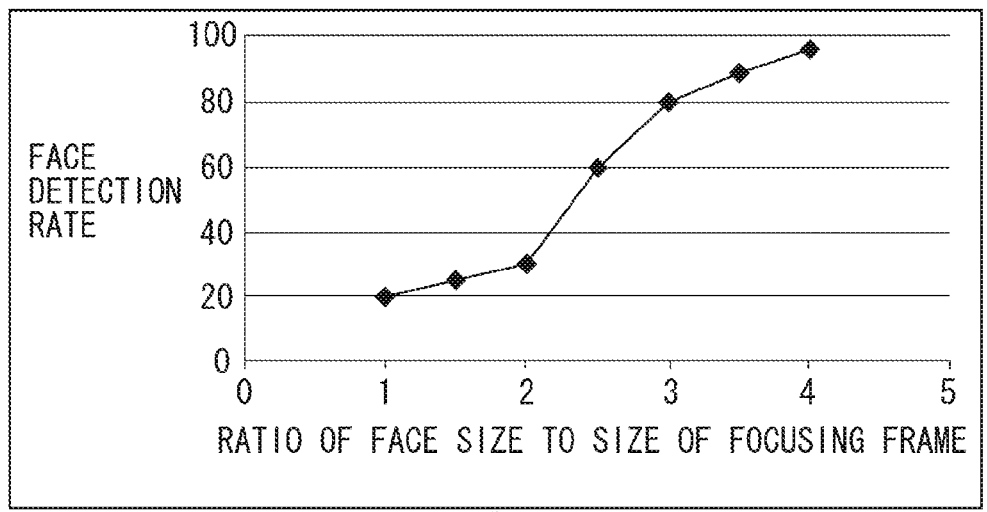
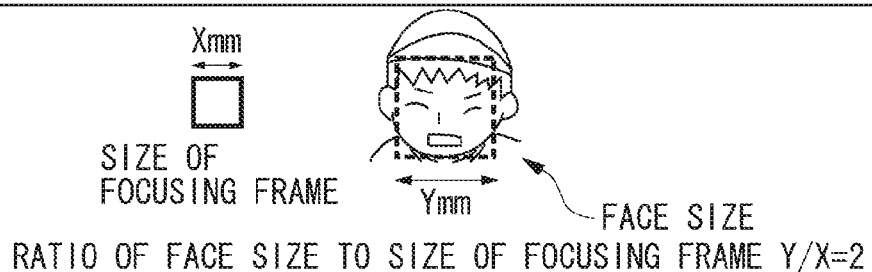
RATIO OF FACE SIZE TO SIZE OF FOCUSING FRAME Y/X=2
RATIO OF FACE SIZE TO SIZE OF FOCUSING FRAME Y/X=3
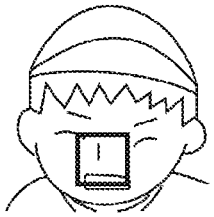
RATIO OF FACE SIZE TO SIZE OF FOCUSING FRAME Y/X=4
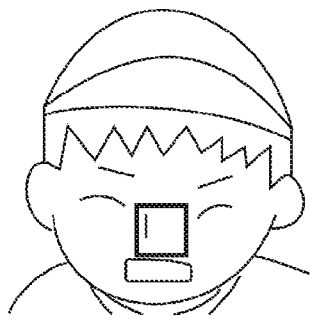

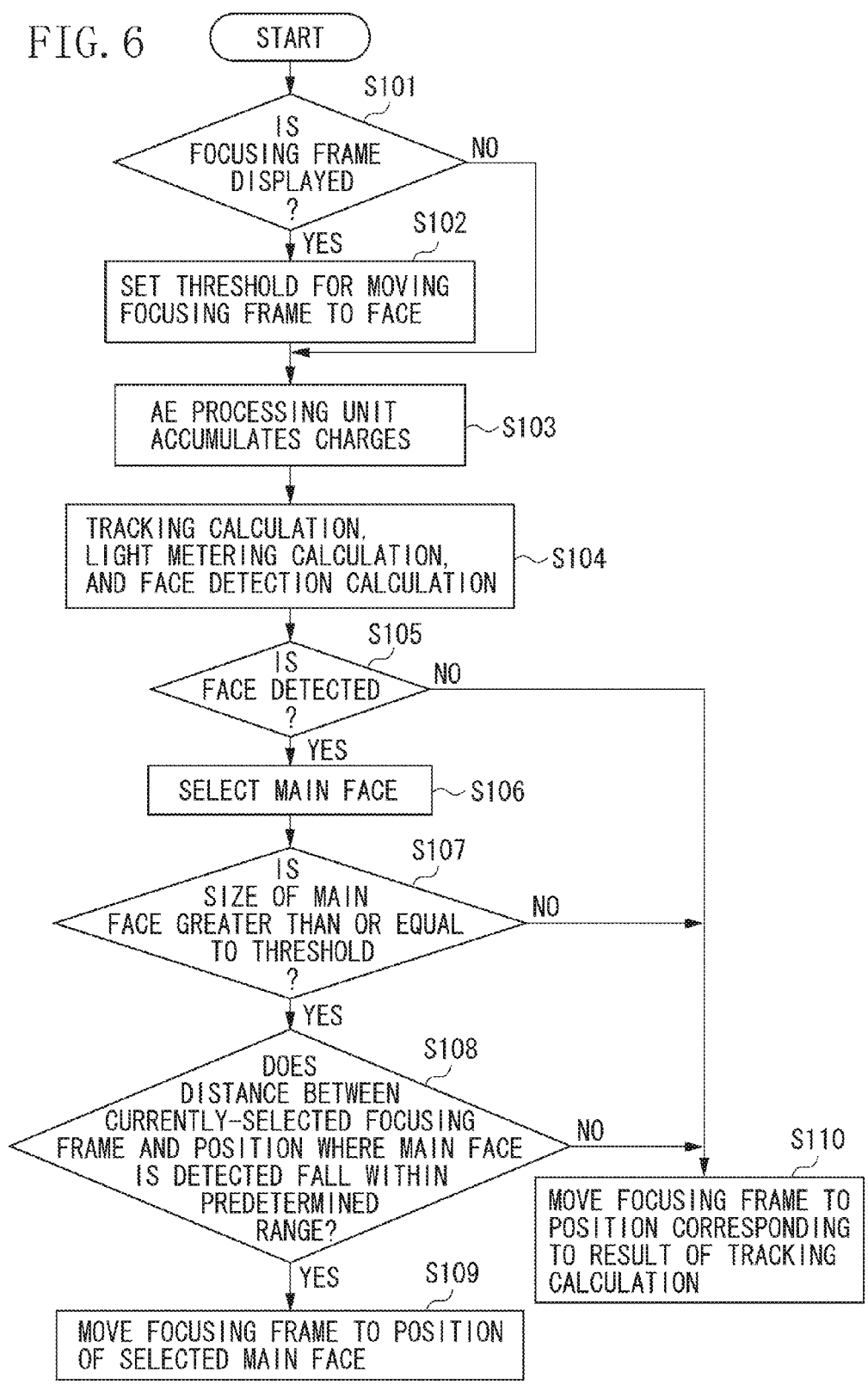

FIG. 9

| RATIO OF FACE SIZE TO SIZE OF FOCUSING FRAME | MOVABLE RANGE OF FOCUSING FRAME |
|---|---|
| LESS THAN 2.0 | NOT MOVABLE |
| GREATER THAN OR EQUAL TO 2.0 AND LESS THAN 2.5 | ONE FRAME ON TOP AND BOTTOM |
| GREATER THAN OR EQUAL TO 2.5 AND LESS THAN 3.0 | ONE FRAME ON LEFT, RIGHT, TOP, BOTTOM, AND DIAGONALLY |
| GREATER THAN OR EQUAL TO 3.0 AND LESS THAN 3.5 | TWO FRAMES ON LEFT, RIGHT, TOP, BOTTOM, AND DIAGONALLY |
| GREATER THAN OR EQUAL TO 3.5 | UNLIMITED |

WHEN CURRENT FOCUSING FRAME IS IN POSITION 8

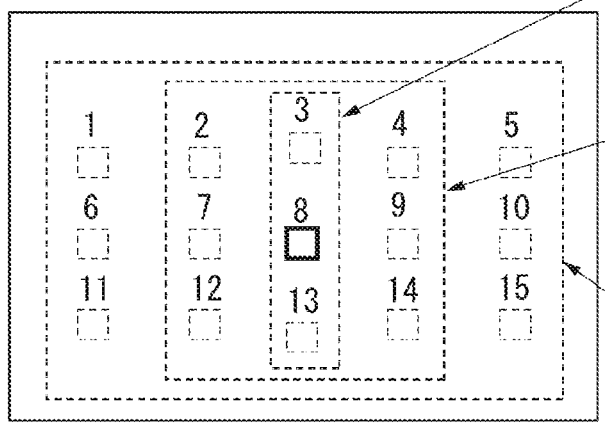

IF RATIO OF FACE SIZE TO SIZE OF FOCUSING FRAME IS GREATER THAN OR EQUAL TO 2.0 AND LESS THAN 2.5

IF RATIO OF FACE SIZE TO SIZE OF FOCUSING FRAME IS GREATER THAN OR EQUAL TO 2.5 AND LESS THAN 3.0

IF RATIO OF FACE SIZE TO SIZE OF FOCUSING FRAME IS GREATER THAN OR EQUAL TO 3.0

IF RATIO OF FACE SIZE TO SIZE OF FOCUSING FRAME IS GREATER THAN OR EQUAL TO 3.5

WHEN CURRENT FOCUSING FRAME IS IN POSITION 15

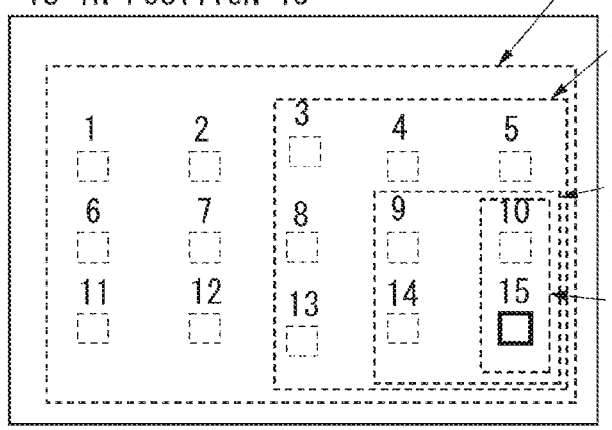

IF RATIO OF FACE SIZE TO SIZE OF FOCUSING FRAME IS GREATER THAN OR EQUAL TO 3.0 AND LESS THAN 3.5

IF RATIO OF FACE SIZE TO SIZE OF FOCUSING FRAME IS GREATER THAN OR EQUAL TO 2.5 AND LESS THAN 3.0

IF RATIO OF FACE SIZE TO SIZE OF FOCUSING FRAME IS GREATER THAN OR EQUAL TO 2.0 AND LESS THAN 2.5

IMAGING APPARATUS HAVING OBJECT DETECTION FUNCTION AND METHOD FOR CONTROLLING IMAGING APPARATUS

BACKGROUND OF THE INVENTION

1. Field of the Invention

The present disclosure relates to an imaging apparatus having an object detection function.

2. Description of the Related Art

Japanese Patent Application Laid-Open No. 2010-96963 discusses a video camera system that includes a configuration for detecting a person's face from a captured video image and a configuration for tracking a predetermined object included in the video image by using pattern matching.

Japanese Patent Application Laid-Open No. 2008-5110 discusses a single-lens reflex camera that includes a second image sensor in addition to an image sensor intended for image capturing. Light transmitted through a focusing screen for an object image to be formed on and a display unit for displaying a selected focusing frame is incident on the second image sensor. In the single-lens reflex camera discussed in Japanese Patent Application Laid-Open No. 2008-5110, the second image sensor generates a video signal and the acquired video signal can be processed to track a predetermined object.

The foregoing techniques can be combined into the configuration that includes a second image sensor on which light transmitted through a focusing screen and a display unit for displaying a focusing frame is incident, and that detects a person's face from a video signal obtained by the second image sensor.

Since the light incident on the second image sensor has been transmitted through the display unit for displaying a focusing frame, the video image obtained from the second image sensor also includes a display of a selected focusing frame. If the focusing frame overlaps a person's face, the face is partially hidden and may become incapable of precise detection.

FIGS. 11A and 11B are diagrams illustrating a problem that occurs when a displayed focusing frame hides a part of a face. The camera can detect the faces of the two persons by using a video signal obtained from the second image sensor in a phase where no focusing frame is displayed.

If a plurality of faces is detected, the camera determines an evaluation value of each of the faces based on the size of the face, the position of the face, and the degree of reliability of the face. The camera then selects a face of the highest evaluation value as a main object. The degree of reliability of a face refers to a value that indicates the probability of an area being a face. The camera determines an area where the probability exceeds a predetermined threshold to be a face area.

The camera determines the right face to be a main object because the right face is greater in size, is closer to the image plane center, and has a higher degree of reliability of a face than the left face. As illustrated in FIG. 11A, the camera selects a focusing frame that lies in a position overlapping the right face, and displays the focusing frame in color.

The focusing frame in color makes the right face undetectable or significantly reduces the degree of reliability of the right face. As a result, the camera may determine the left face to be a main object as illustrated in FIG. 11B.

In other words, if there is a plurality of faces and a focusing frame is displayed over a face that is selected as a main object, it becomes difficult to select the same face to be a main object again.

The foregoing description has been given in the context of the function of detecting a face as an object. A similar problem can occur if a camera has a function of detecting a predetermined particular object (for example, a particular person, or a particular animal or physical object like a dog and a car).

SUMMARY OF THE INVENTION

According to an aspect disclosed herein, an imaging apparatus includes: a display unit configured to display a focusing frame to indicate a position of the focusing frame; a light metering unit on which light transmitted through the display unit is incident; a detection unit configured to detect a predetermined object from an image signal obtained by the light metering unit; and a processing unit configured to select at least one of a plurality of focusing frames displayable by the display unit according to a result of detection by the detection unit, and to cause the display unit to display the selected focusing frame, wherein the processing unit moves a position of a focusing frame to be displayed by the display unit to a position corresponding to the detected object if a ratio of a size of the detected object to a size of the focusing frame displayed on the display unit is greater than or equal to a predetermined threshold, and does not move the position of the focusing frame to be displayed by the display unit to a position corresponding to the detected object if the ratio is less than the threshold.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and, together with the description, serve to explain the principles disclosed herein.

FIG. 3 is a diagram illustrating the relationship between the ratio of a face size to the size of a focusing frame and a face detection rate when a focusing frame is displayed.

FIG. 6 is a flowchart illustrating a procedure for moving a focusing frame according to a result of face detection and tracking.

FIG. 9 is a diagram illustrating examples of a movable range of a focusing frame in relation to the ratio of a face size to the size of a focusing frame.

DESCRIPTION OF THE EMBODIMENTS

Various exemplary embodiments, features, and aspects of the disclosure will be described in detail below with reference to the drawings.

Figure 1:
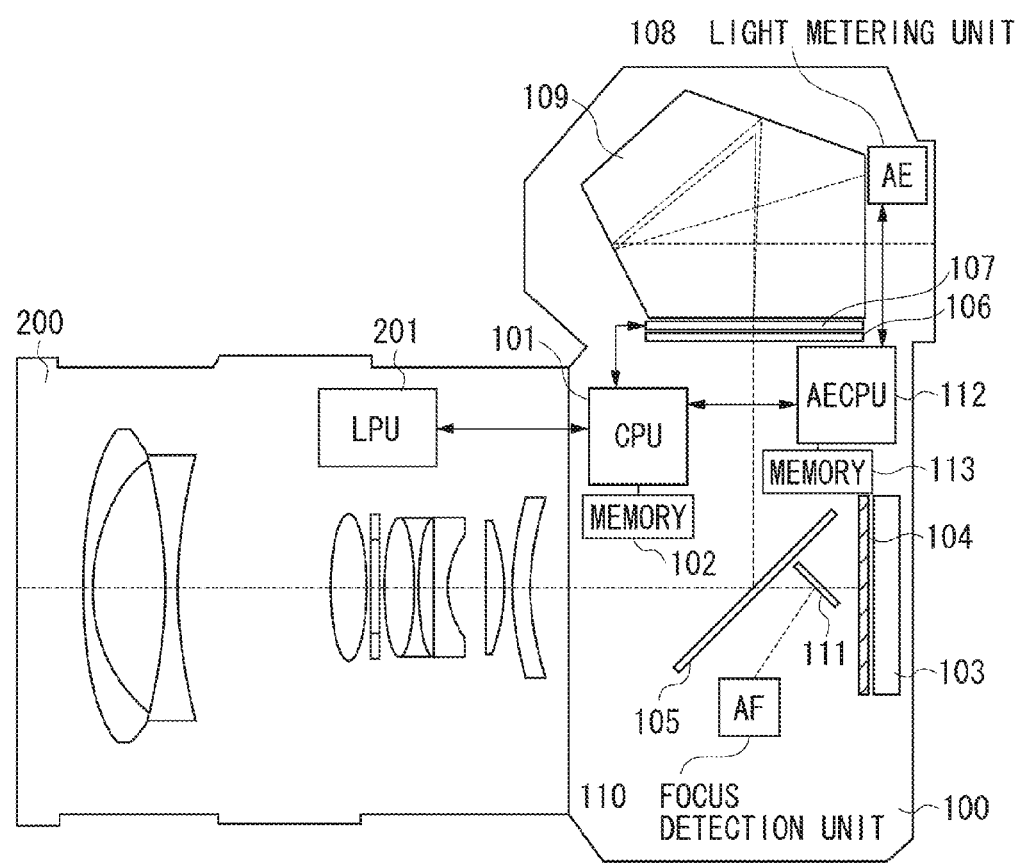
FIG. 1 is a diagram schematically illustrating the configuration of essential parts of a camera according to an exemplary embodiment of the present disclosure.

FIG. 1 is a diagram schematically illustrating the configuration of essential parts of a single-lens reflex camera, which is an imaging apparatus according to an exemplary embodiment disclosed herein. FIG. 1 illustrates cross sections of a camera body 100 and a photographic lens unit 200.

A central processing unit (CPU) 101 controls the components of the camera body 100. A memory 102 includes a random access memory (RAM) and a read-only memory (ROM). The memory 102 is connected to the CPU 101. An image sensor 103 includes a charge-coupled device (CCD) or complementary metal oxide semiconductor (CMOS) sensor equipped with an infrared cut filter and/or a low-pass filter. When the camera captures an image, an object image is formed on the image sensor 103 through the photographic lens unit 200. A shutter 104 closes shutter blades to shield the image sensor 103 from light when the camera does not capture an image. The shutter 104 opens the shutter blades to guide light to the image sensor 103 when the camera captures an image. A half mirror 105 reflects part of light incident from the photographic lens unit 200 to form an image on a focusing screen 106 when the camera does not capture an image.

A display unit 107 is a transmissive display element. The display unit 107 displays a focusing frame in color under instructions from the CPU 101, the focusing frame indicating the position of the focusing frame in a field of view. By displaying a focusing frame, the display unit 107 indicates to a user which position in the object a piece of focusing information in use is of, when the user views an optical viewfinder.

Figure 2:
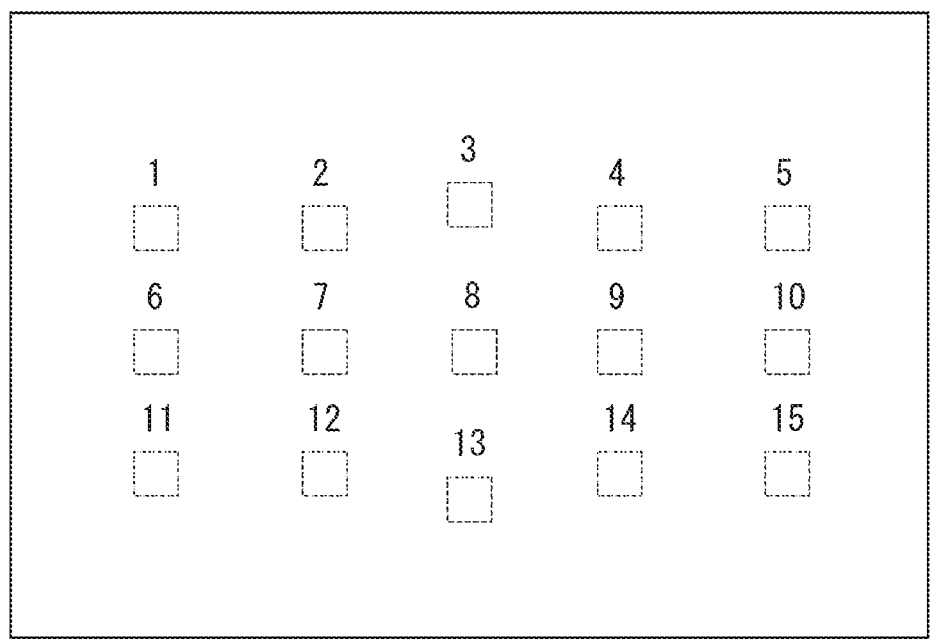
FIG. 2 is a diagram illustrating an example of layout of focusing frames in a display unit.

FIG. 2 illustrates an example of layout of focusing frames to be displayed on the display unit 107. The 15 frames in broken lines, designated by numerals 1 to 15, indicate the positions of focusing frames. An example of the display unit 107 is a transmissive polymer network liquid crystal display element. Such focusing frames are highly transmissive and have little effect on an image signal obtained by a light metering unit 108 when not selected as a focusing frame pertaining to a main object. On the other hand, a focusing frame selected as one pertaining to a main object is displayed in color, and an image of the selected focusing frame is included in an image signal obtained by the light metering unit 108.

The light metering unit 108 includes a light metering sensor which meters a light flux incident through the photographic lens unit 200. An image sensor such as a CCD sensor or a CMOS sensor is used as the light metering unit 108. The light metering unit 108 is thus capable of face detection and tracking in addition to light metering. As illustrated in FIG. 1, the display unit 107 is arranged in the middle of an optical path along which light incident through the photographic lens unit 200 is guided to the light metering unit 108.

A pentagonal prism 109 guides an object image from the focusing screen 106 to the light metering unit 108 and a not-illustrated optical viewfinder. The object image formed on the focusing screen 106 is incident on the light metering unit 108 through the pentagonal prism 109. Part of the light incident through the photographic unit 200, transmitted through the half mirror 105, is guided to a focus detection unit 110 by an autofocus (AF) mirror 111. The focus detection unit 110 performs focusing by using the light guided by the AF mirror 111. An automatic exposure CPU (AECPU) 112 is a CPU that performs image processing and calculations by using a signal obtained by the light metering unit 108. The AECPU 112 serves as an object detection unit. In the camera according to the exemplary embodiment of the present invention, the AECPU 112 performs face detection and tracking calculations as well as light metering calculations. A memory 113 includes a RAM and/or a ROM. The memory 113 is connected to the AECPU 112. Note that while the camera according to the exemplary embodiment of the present invention includes the AECPU 112 in addition to the CPU 101, the CPU 101 may provide the functions of both. A lens processing unit (LPU) 201 is a CPU arranged inside the photographic lens unit 200. The LPU 201 transmits distance information on an object to the CPU 101.

Figure 4:
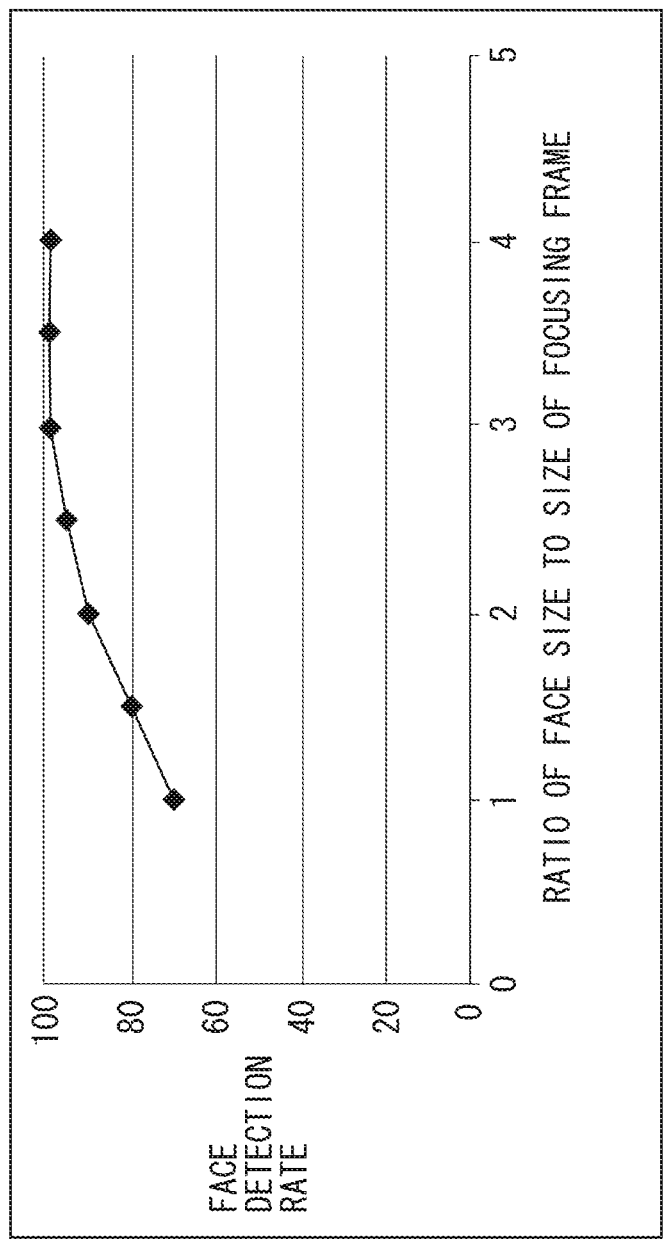
FIG. 4 is a graph illustrating the relationship between the ratio of a face size to the size of a focusing frame and the face detection rate when no focusing frame is displayed.

Next, the relationship between the size of a face with respect to a focusing frame and a face detection rate will be described with reference to FIGS. 3 and 4. The face detection rate refers to the probability of successful face detection.

FIG. 3 is a graph illustrating the relationship between the ratio of the size of a face to the size of a focusing frame and the face detection rate of the face when a focusing frame is displayed in a position overlapping the face. FIG. 4 is a graph illustrating the relationship between the ratio of the size of a face to the size of a focusing frame and the face detection rate when no focusing frame is displayed.

As illustrated in FIG. 3, the camera according to the exemplary embodiment of the present invention defines the size of a focusing frame in terms of the lateral dimension of the focusing frame. The size of a face is defined by a square with the width of the face as a side, the bottom side falling on the bottom end of the chin. It will be understood that such definitions are just an example of how to express the size of a focusing frame and a face size. The definitions of the size of a focusing frame and a face size are not limited thereto.

Face detection is performed, for example, by template matching based on the outline of the entire face and face components (including the eyes, nose, and ears). Alternatively, a neural network may be used to perform learning by using prepared material images so that face-like areas are detected as faces.

As illustrated in the graph of FIG. 3, when a face size is small with respect to the size of a focusing frame, the focusing frame can overlap and hide components needed for face detection, such as the eyes and mouth. This results in low face detection rates. A comparison between FIGS. 3 and 4 shows that the face detection rate improves when no focusing frame is displayed as compared to when a focusing frame is displayed. The face detection rate thus varies greatly depending on whether a focusing frame is displayed.

Figure 5:
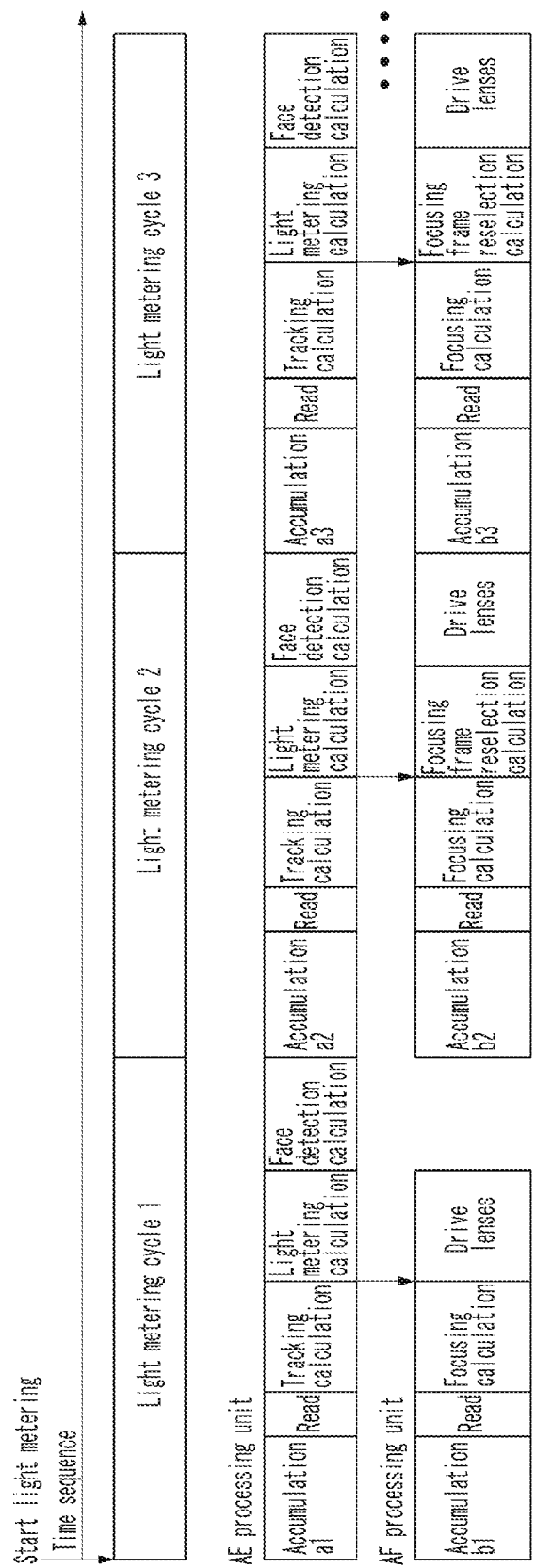
FIG. 5 is a diagram illustrating face detection and tracking sequences.

Next, face detection and tracking sequences will be described with reference to FIG. 5. In the following description, an "automatic exposure (AE) processing unit" and an "AF processing unit" each refer to a unit that includes a sensor and a CPU of the corresponding processing system. For example, the AE processing unit refers to the light metering unit 108, the AECPU 112, and the memory 113 connected to the AECPU 112. The AF processing unit refers to the focus detection unit 110, the CPU 101, and the memory 102 connected to the CPU 101.

The AE processing unit and the AF processing unit repeat a light metering calculation and a focusing calculation at predetermined cycles. Such predetermined cycles will be referred to respectively as "light metering cycle 1," "light metering cycle 2," "light metering cycle 3," . . . .

Initially, "light metering cycle 1" is started according to a light metering start command from the CPU 101. When light metering cycle 1 is started, the AE processing unit accumulates charges in period a1 and reads the accumulated charges. In parallel with the AE processing unit, the AF processing unit accumulates charges in period b1 and reads the accumulated charges. Subsequently, the AE processing unit performs a tracking calculation on a read image signal. The AF processing unit performs a focusing calculation on a read image signal.

The AF processing unit drives a group of lenses included in the photographic lens unit 200 based on a result of the focusing calculation. The AF processing unit thereby performs an AF operation based on information on any one of the focusing frames.

The tracking calculation by the AE processing unit includes extracting highly correlative areas from two or more image signals included in a video signal, thereby determining a position to which an area to be tracked has moved. In the first tracking calculation after the light metering command, no area to be tracked has been determined yet. The AE processing unit, therefore, actually performs no tracking processing.

The AE processing unit then performs a light metering calculation by using the read image signal. The AE processing unit subsequently performs a face detection calculation on the read image signal. If any face is detected, the AE processing unit determines and stores the coordinates, size, and the degree of reliability of the face(s).

In the next "light metering cycle 2," the AE processing unit again accumulates charges in period a2 and reads the accumulated charges. The AF processing unit accumulates charges in period b2 and reads the accumulated charges. The AE processing unit then performs a tracking calculation. The AF processing unit performs a focusing calculation.

If a face is detected in the previous light metering cycle 1, the AE processing unit sets a tracking area according to the size of the face around the position of the face obtained from the image signal of the immediately preceding light metering cycle (light metering cycle 1). If a plurality of faces is detected in light metering cycle 1, the AE processing unit sets tracking areas for the respective faces.

Next, the AE processing unit determines where each face detected from the image signal obtained in the immediately preceding light metering cycle 1 has moved to in the image signal obtained in light metering cycle 2. For example, the AE processing unit extracts an area the most highly correlative with a face area detected in the immediately preceding light metering cycle 1, from among the tracking area(s) set in light metering cycle 1. The AE processing unit then determines that the face has moved to the extracted area. Specifically, suppose that an image signal is determined to include a face area in the immediately preceding light metering cycle 1. The AE processing unit superimposes the image signal on a part of a tracking area of an image signal obtained in light metering cycle 2, thereby determining differences in the levels of signals that indicate luminance information and color information. The AE processing unit repeats such processing while shifting the position to superimpose the image signal determined to include a face area on the image signal of the tracking area. The AE processing unit determines that one of tracking areas that minimizes the differences in signal level is an area of the highest correlation. If a focusing frame is displayed image signals on which the display of the focusing frame is reflected can interfere with correlation determination. Signals in the same color as the focusing frame may be excluded from correlation calculations.

Now, if no face is detected in the immediately preceding light metering cycle 1, the AE processing unit sets a tracking area around a focusing frame that is selected in the immediately preceding light metering cycle 1 or the position of an object that is successfully tracked in the immediately preceding light metering cycle 1. A focusing frame selected in the immediately preceding light metering cycle may refer to a focusing frame that is specified by a user's manual operation.

When a focusing frame is specified, the AE processing unit performs a tracking calculation to extract an area of the highest correlation from the image signal of light metering cycle 2 with reference to the image signal of an area surrounded by the selected focusing frame in the image signal obtained in the immediately preceding light metering cycle 1. If an object is successfully tracked in the immediately preceding light metering cycle 1, the AE processing unit performs a tracking calculation to extract an area of the highest correlation from the image signal of light metering cycle 2 with reference to the image signal of the area of the object extracted by the tracking.

The AF processing unit subsequently receives the result of the tracking calculation from the AE processing unit, and performs a calculation to select a focusing frame. If no face is detected in light metering cycle 1, the AF processing unit moves a focusing frame according to only the result of the tracking processing of the AE processing unit (i.e., tracking processing using luminance information and color information) in light metering cycle 2. If a face is detected in light metering cycle 1, the AF processing unit moves a focusing frame to the position of the face detected in light metering cycle 1 as long as predetermined conditions are satisfied.

The AF processing unit drives a group of lenses included in the photographic lens unit 200 for an AF operation based on the result of the focusing calculation obtained from the newly selected focusing frame.

The AE processing unit further performs a light metering calculation and a face detection calculation by using the image obtained in light metering cycle 2. In light metering cycle 3 and later, the AE processing unit and the AF processing unit repeat such operations.

Next, a method and program for controlling the camera according to the exemplary embodiment will be described with reference to FIG. 6. The method and program for controlling the camera according to the exemplary embodiment are intended to cause the camera according to the exemplary embodiment of the present invention to move a focusing frame based on a result of face detection and tracking.

FIG. 6 is a flowchart illustrating a procedure of an algorithm for moving a focusing frame based on face detection and tracking. The procedure is stored as a program in the memory 113. The CPU 101 and the AECPU 112 read the program from the memory 113 and execute the program. In other words, the CPU 101 and the AECPU 112 serve as a computer of the camera.

The CPU 101, a processing unit, starts face detection and tracking processing. In step S101, the CPU 101 initially determines whether a focusing frame is displayed on the display unit 107. If a focusing frame is displayed on the display unit 107 (YES in step S101), the CPU 101 proceeds to step S102.

In step S102, the CPU 101 sets a threshold for "the ratio of a face size to the size of a focusing frame." The threshold is used to determine whether to move a focusing frame from the position of the currently-selected focusing frame to the position of a face that is newly detected. The threshold is set to "the ratio of a face size to the size of a focusing frame" at which the face detection rate becomes a desired value (or higher than or equal to a desired value). For example, in order to move a focusing frame to a face whose face detection rate is higher than or equal to 80%, the threshold is set to "3" as illustrated in FIG. 3. The relationship between "the face detection rate" and "the ratio of a face size to the size of a focusing frame" depends on the shape of the focusing frame and the thickness of the lines of the focusing frame. Each type of a display unit may be measured to determine the relationship, and the threshold may be set based on the measurement results. Alternatively, if a focusing frame lying in a position overlapping a face is currently selected, the same value as "the ratio of a face size to the size of a focusing frame" of that face or a greater value may be set as the threshold.

Since the focusing frames have the same size, setting a threshold for the ratio of a face size to the size of a focusing frame is equivalent to setting a threshold for a face size. For the sake of simplicity, that the ratio of a face size to the size of a focusing frame exceeds a threshold may hereinafter be referred to simply that a face size exceeds a threshold.

If, in step S101, the CPU 101 determines that no focusing frame is displayed on the display unit 107 (NO in step S101), the CPU 101 does not need to set a threshold for moving a focusing frame to a face, because there is no focusing frame to interfere with face detection. As illustrated in FIG. 4, the face detection rate decreases gradually with a decreasing face size. The CPU 101, therefore, sets a threshold of predetermined magnitude in advance even if no focusing frame is determined to be displayed on the display unit 107. The threshold of predetermined magnitude can be a value smaller than the threshold set in step S102.

In such a manner, the CPU 101 changes the threshold depending on whether a focusing frame is displayed on the display unit 107.

In step S103, the AECPU 112 causes the AE processing unit to accumulate charges in period a1 and to generate an image signal.

In step S104, the AECPU 112 performs a tracking calculation, a light metering calculation, and a face detection calculation by using the image signal obtained in step S103. The AECPU 112 transmits the result of the tracking calculation and the result of the face detection calculation to the CPU 101. The result of the face detection calculation includes information on the size, coordinates, and the degree of reliability of each detected face if any.

In step S105, the CPU 101 determines whether a face is detected by the face detection calculation in step S104.

If no face is detected (NO in step S105), the CPU 101 proceeds to step S110 to move a focusing frame to a position corresponding to the result of the tracking calculation in step S104.

On the other hand, if a face or faces is/are detected (YES in step S105), the CPU 101 proceeds to step S106. In step S106, the CPU 101 selects a face to be a main object (hereinafter, referred to as a main face) from among the detected face(s). The main object is the target tracked by tracking processing. When only a single face is detected in step S105, the CPU 101 selects the detected face as a main face. When a plurality of faces is detected in step S105, the CPU 101 selects one of the faces as a main face. For example, the CPU 101 selects a main face according to the coordinates, sizes, and the degrees of reliability of detected faces. A face is more likely to be selected as a main face as the position of the face is closer to the image center, the size of the face greater, and the degree of reliability of the face higher. In the present exemplary embodiment, the CPU 101 may be configured to select a main face based on at least the coordinates and sizes of faces.

In step S107, the CPU 101 determines whether the size of the main face is greater than or equal to the set threshold. The threshold refers to the one described in step S102.

If the size of the main face is smaller than the threshold (NO in step S107), the AECPU 112 proceeds to step S110. In step S110, the AECPU 112 moves a focusing frame to a position corresponding to the result of the tracking calculation in step S104.

On the other hand, if the size of the main face is greater than or equal to the threshold (YES in step S107), the AECPU 112 proceeds to step S108. In step S108, the AECPU 112 calculates the distance between the currently-selected focusing frame and the position where the main face is detected.

If the calculated distance falls within a predetermined range (if the calculated distance is smaller than or equal to a predetermined distance; YES in step S108), the AECPU 112 proceeds to step S109. If the calculated distance does not fall within the predetermined range (NO in step S108), the AECPU 112 proceeds to step S110.

If the currently-selected focusing frame is far away from the position of the main face, it is likely that a person's face the user considers as a main object is not detected due to the effect of the focusing frame and another person's face is selected as the main face. If the distance between the currently-selected focusing frame and the main face does not fall within the predetermined range, then the AECPU 112 will not regard the main face as a main object (a target to be tracked) or move a focusing frame.

In step S109, the AECPU 112 moves a focusing frame to the position of the selected main face. The AE processing unit then performs an AE operation in the moved position. A specific value of the "predetermined range" is set as appropriate according to the size of a face detected in the immediately previous light metering cycle.

FIG. 9 is a diagram illustrating examples of a movable range of a focusing frame in relation to a face size. Examples of a movable range of a focusing frame for situations when focusing frame 8 is selected and when focusing frame 15 is selected are illustrated. Determining the movable range of a focusing frame in relation to a face size can increase the probability that a focusing frame moves to a face intended by the user.

The camera may be configured to provide additional processing of moving a focusing frame to the position of a face other than a currently-selected focusing frame when no face is detected in the position of the currently-selected focusing frame several times in succession. Suppose, for example, that the ratio of a face size to the size of a focusing frame is 3 (=the face detection rate is 80%). Without the additional processing, a focusing frame may move to another face unintended by the user at a probability of 20%. The addition of the processing can significantly reduce the probability.

For example, a configuration with the additional processing of "moving a focusing frame to the position of a face other than a currently-selected focusing frame if no face is detected in the position of the currently-selected focusing frame three times in succession" will be described. When the face detection rate is 80%, the addition of the processing reduces the probability P that a focusing frame moves to an unintended face (=the probability that no face is detected three times in succession) to approximately 1%, which is given by the following equation (1):

$$P = 1 - (1/5)^3 = 124/125 = 0.992 (\%). \tag{1}$$

Next, a description will be given of the movement of a focusing frame when the method of controlling the camera according to the exemplary embodiment of the present invention is performed.

FIGS. 7A, 7B, 7C, and 7D are diagrams illustrating a transition from a state where a focusing frame lying in a position overlapping an object other than a face is selected to a state where a focusing frame lying in a position overlapping a face is selected.

Figure 7A:
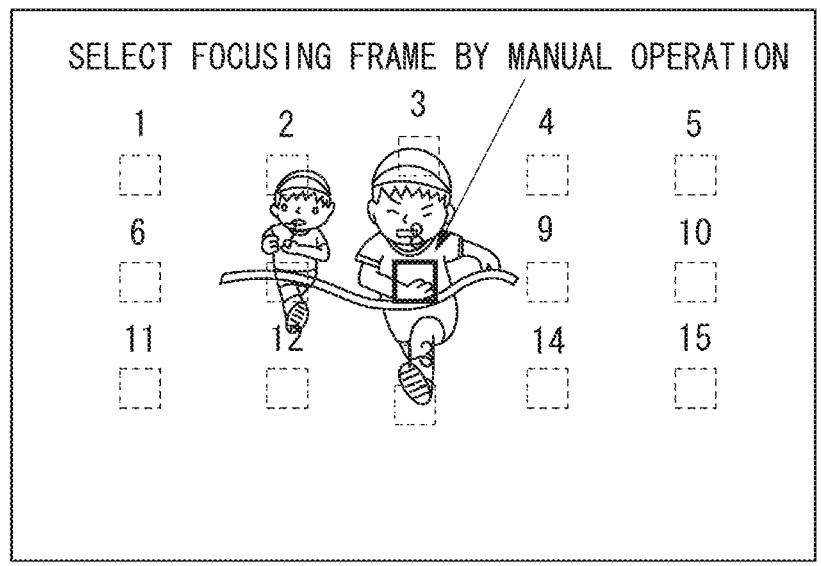
FIGS. 7A, 7B, 7C, and 7D are diagrams illustrating a transition from a state where a focusing frame lying in a position overlapping an object other than a face is selected to a state where a focusing frame lying in a position overlapping a face is selected.
Figure 7B:
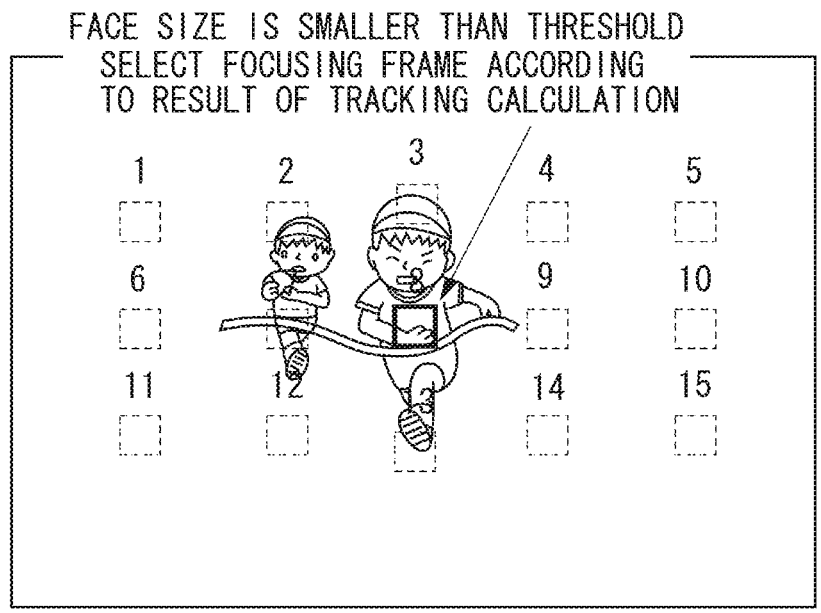
Figure 7C:
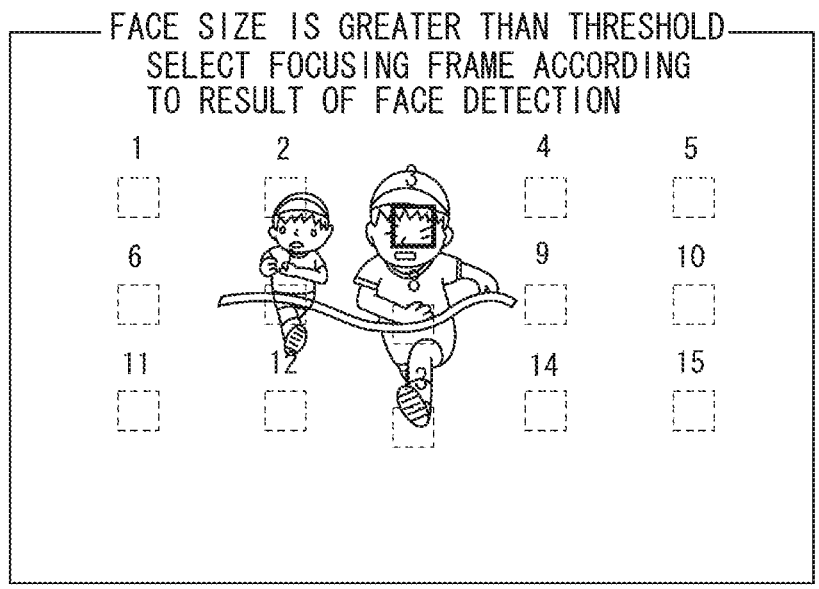
Figure 7D:
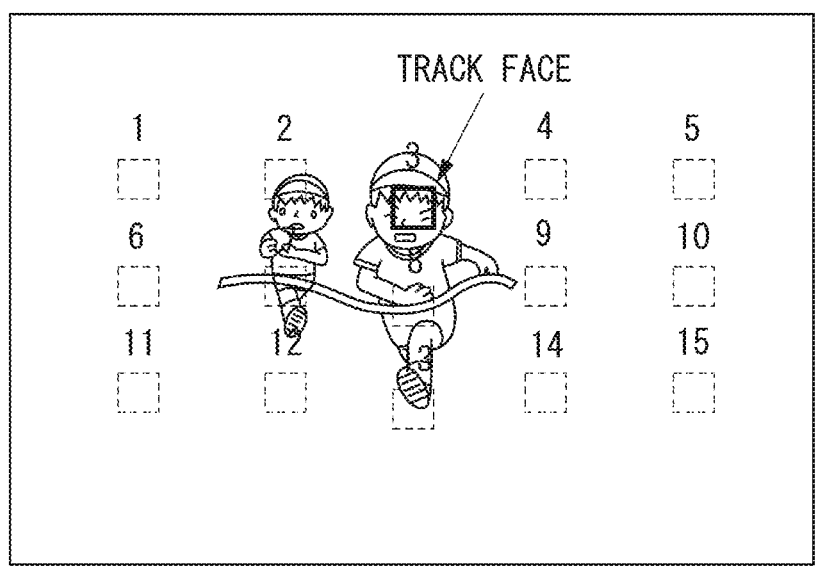

Suppose, as illustrated in FIG. 7A, that the user initially sets a focusing frame to the body of a main object. In such a case, as illustrated in FIG. 7B, the AECPU 112 performs an AE operation in that position (body) with the image signal of the area in the position of the currently-selected focusing frame (focusing frame 8) as the target of a tracking calculation until the ratio of the size of the face of the main object to the size of the focusing frame exceeds a threshold. As illustrated in FIG. 7C, if the ratio of the size of the face of the main object to the size of the focusing frame exceeds the threshold, the AECPU 112 newly selects a focusing frame that lies in a position overlapping the face of the main object. The camera then performs an AF operation on the face. As a result, the face of the main object (=main face) comes into focus. As illustrated in FIG. 7D, the AECPU 112 tracks the face of the main object to maintain the state that the face of the main object is in focus.

Figure 8A:
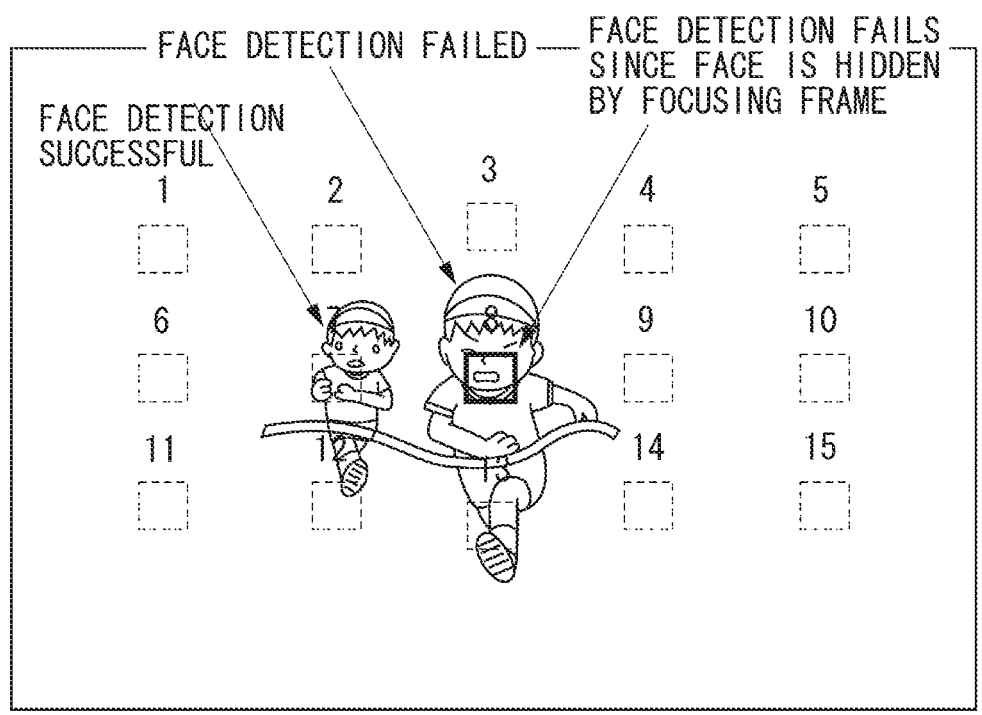
FIGS. 8A and 8B are diagrams illustrating a state where a focusing frame lying in a position overlapping a face is selected.
Figure 8B:
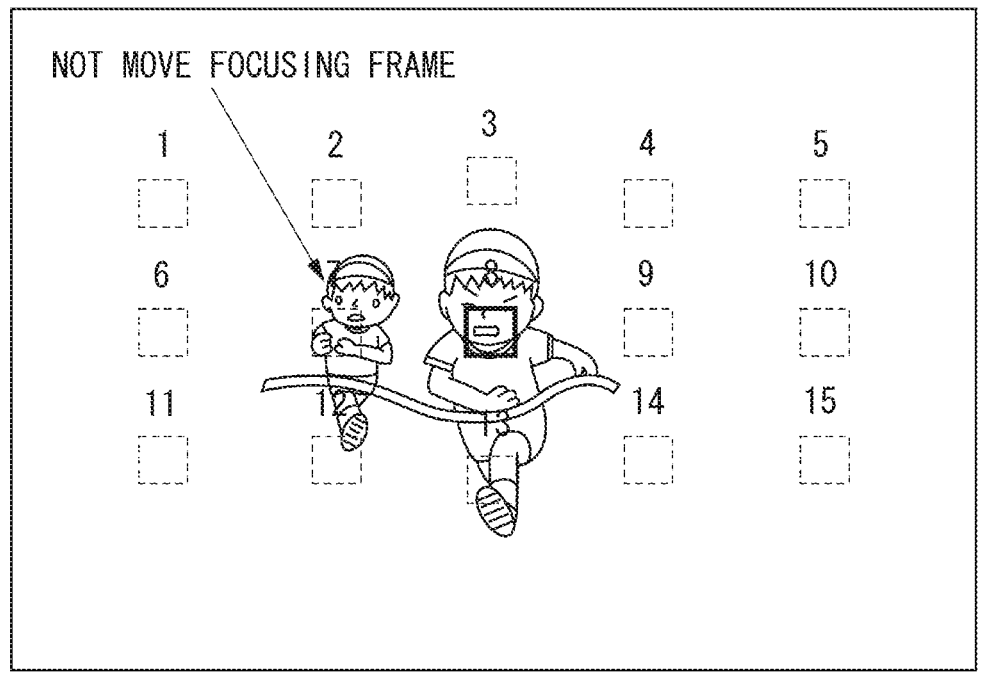

FIGS. 8A and 8B are diagrams illustrating a state where a focusing frame lying in a position overlapping a face is selected.

The AECPU 112 detects two faces with no focusing frame selected. The right face is greater in size, is closer to the image plane center, and has a higher degree of reliability of a face than the left face. The AECPU 112 thus determines the right face to be a main object. The AECPU 112 then selects a focusing frame that lies in a position overlapping the right face, and displays the selected focusing frame in color.

FIG. 8A illustrates an image signal that the AE processing unit obtains in the immediately succeeding light metering cycle. The AECPU 112 fails to detect the right person's face, which lies in the position of the selected focusing frame, due to the effect of the display of the focusing frame. However, the AECPU 112 can detect the left person's face.

At this point in time, only the left person's face is successfully detected. According to conventional techniques, a new focusing frame would have been selected in a position overlapping the left person's face, which is small but successfully detected. The camera according to the present exemplary embodiment sets a threshold for a face size so that even if the face of a main object is not detected and another person's face is detected, no new focusing frame is selected unless the another person's face has a sufficient size. Thus, the camera can continue performing an AF operation on the face of the main object as illustrated in FIG. 8B.

Figure 10A:
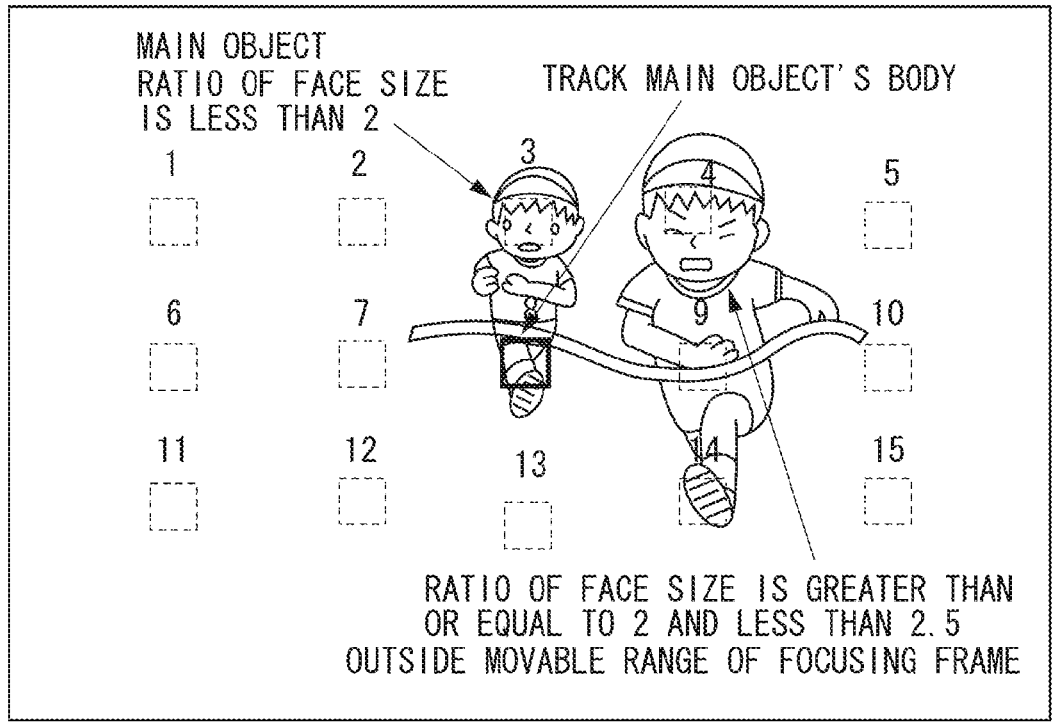
FIGS. 10A and 10B are diagrams illustrating the effect of defining a movable range of a focusing frame in relation to the ratio of a face size to the size of a focusing frame.

An advantage of determining the movable range of a focusing frame in relation to a face size illustrated in FIG. 9 will be described with reference to FIGS. 10A and 10B. Suppose, as illustrated in FIG. 10A, that the user initially selects a focusing frame that lays in the position of the body of the left person. Suppose also that the threshold for a face size for allowing movement of a focusing frame is set to "2." The left person's face is still too small to be capable of face detection. On the other hand, the right person's face, which is not selected by the user, has a size capable of face detection and the ratio of the size of the face to the size of a focusing frame is greater than or equal to 2 and less than 2.5. If there is determined only the threshold of "2" for a face size for allowing movement of a focusing frame without the movable range of a focusing frame being set, a focusing frame may move to the right person's face, which is not a main object.

As illustrated in FIG. 9, limiting the movable range of a focusing frame in relation to a face size can suppress movement of a focusing frame to a face different from one intended by the user. Consequently, the camera tracks the position of the left person's body, and performs an AF operation by using information obtained from the focusing frame lying in a position overlapping the body.

Figure 10B:
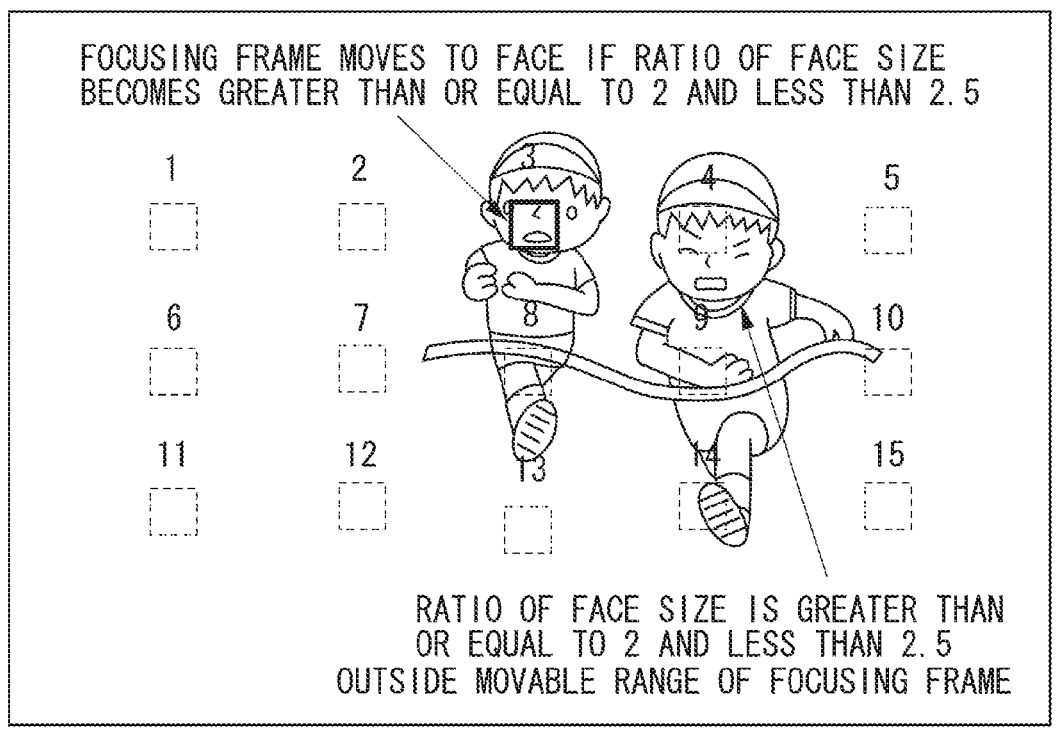
Figure 11A:
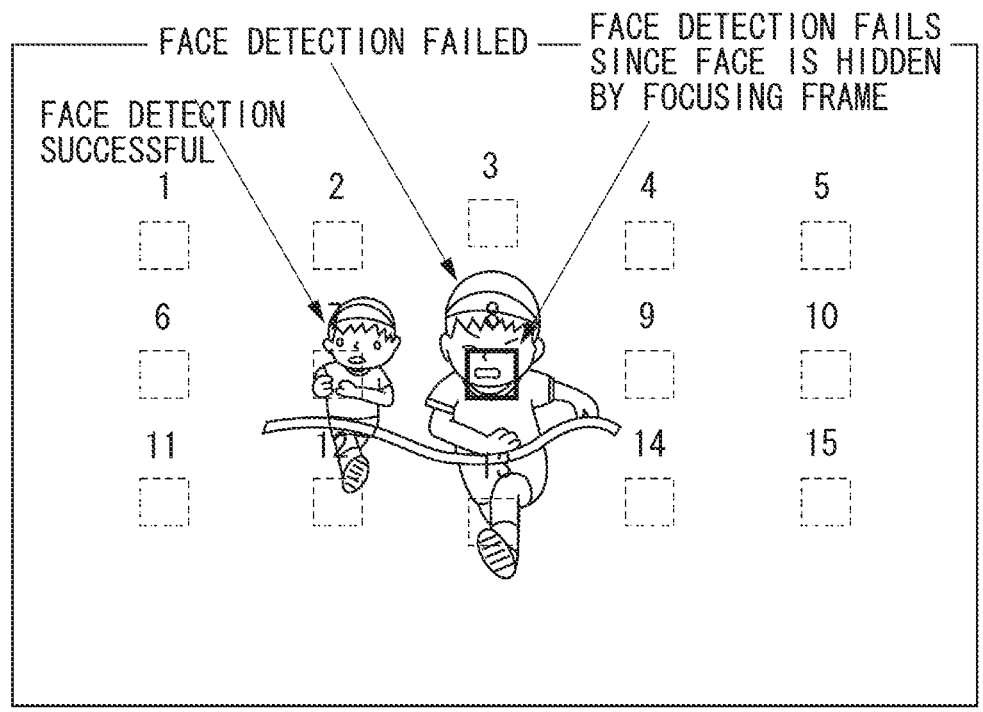
FIGS. 11A and 11B are diagrams illustrating a problem that occurs with a conventional camera when a displayed focusing frame hides a part of a face.
Figure 11B:
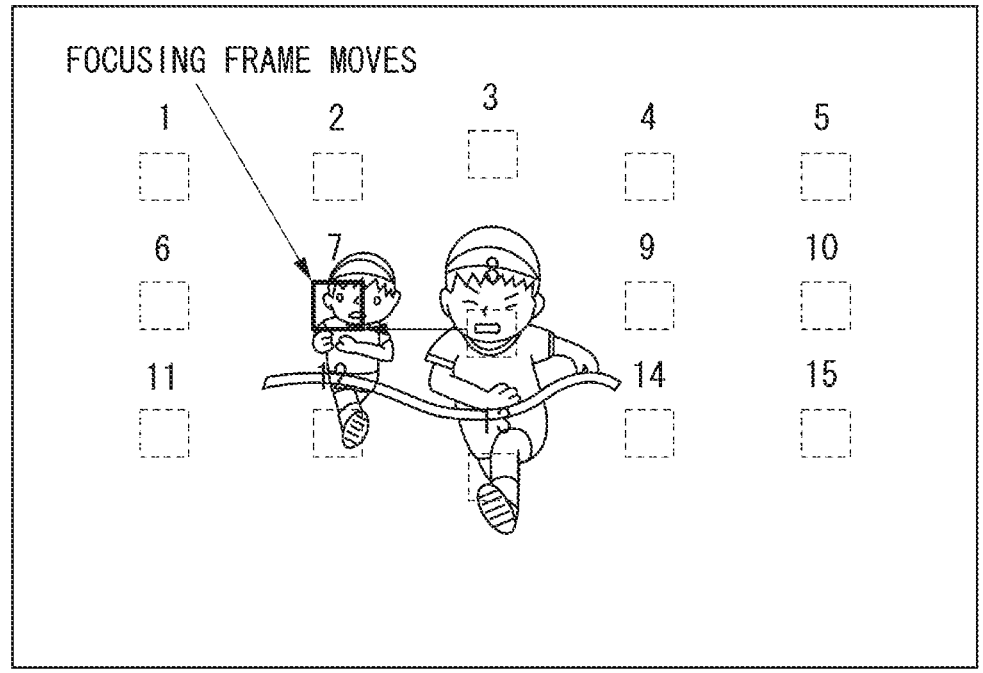

As illustrated in FIG. 10B, the left person approaches the camera and the left person's face becomes detectable. When the ratio of the size of the face of the main object to the size of a focusing frame exceeds "2," the camera newly selects focusing frame 3 instead of focusing frame 8. Here, focusing frame 3 lies within the movable range corresponding to the size of the face and overlaps the face. Focusing frame 8 is in a position overlapping the body. The AECPU 112 tracks the left person, and the camera performs an AF operation by using information obtained from the focusing frame lying in a position overlapping the face. Since the left person's face is hidden by the focusing frame, a focusing frame can possibly move to the right person's face. In order to prevent such a movement, a procedure may be interposed to temporarily prohibit movement of a focusing frame to a face found in another position once face detection is successful and a face starts being tracked.

As has been described above, according to a conventional configuration, a focusing frame moves to another face if there is a plurality of faces in an object and a face currently being tracked becomes undetectable due to a displayed focusing frame. According to the exemplary embodiment of the present invention, however, the AECPU 112 continues tracking by using a currently-selected focusing frame, and only if there is a face having a size greater than a threshold, moves a focusing frame to that face. According to the exemplary embodiment of the present invention, a focusing frame can thus be prevented from moving from a position intended by the user to another position even when the face of a main object (=main face) becomes undetectable and when a face detection rate drops.

In step S101 of FIG. 6, the CPU 101 simply determines whether a focusing frame is displayed. However, the CPU 101 may determine whether a focusing frame lying in a position overlapping a face is displayed. Alternatively, in step S102, the CPU 101 may set a smaller threshold for the case where a focusing frame is displayed before a face is detected than for the case where a focusing frame is displayed after a face is detected. The reason is that the possibility of face detection being interfered with the display of a focusing frame is low when no face is detected.

In the flowchart of FIG. 6, the CPU 101 makes the determinations of steps S107 and S108 only on a main face. However, the CPU 101 may make the determinations of steps S107 and S108 on all faces detected.

The foregoing exemplary embodiment has dealt with the function of detecting a face. Similar configuration can be applied if there is provided a function of detecting a predetermined particular object (for example, a particular person, or a particular animal or physical object like a dog and a car). An exemplary embodiment of the present invention is not limited to a camera that captures still images, but may be applied to a camera that captures moving images.

An exemplary embodiment of the present invention also covers a configuration that supplies a program for implementing the functions of the foregoing exemplary embodiment to a system or apparatus directly from a recording medium or via wired or wireless communications and executes the program, the system or apparatus including a computer capable of executing a program. Program code itself to be supplied to and installed in a computer in order to implement the functional processing of an exemplary embodiment of the present invention on the computer, therefore, also constitutes an exemplary embodiment of the present invention. In other words, a program itself for implementing the functional processing of an exemplary embodiment of the present invention is also covered by an exemplary embodiment of the present invention. Such a program may have any form as long as having the functions of the program. Examples include object code, a program to be executed by an interpreter, and script data to be supplied to an operating system (OS). Applicable examples of recording media for supplying the program include magnetic recording media such as a flexible disk, a hard disk, and a magnetic tape, as well as a magneto-optical disk (MO), a compact disc read-only memory (CD-ROM), a compact disc-recordable (CD-R), a compact disc-rewritable (CD-RW), a digital versatile disc read-only memory (DVD-ROM), a digital versatile disk-recordable (DVD-R), and a digital versatile disk-rewritable (DVD-RW). Optical and magneto optical storage media and nonvolatile semiconductor memories are also applicable.

While the present invention has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Applications No. 2011-145933 filed Jun. 30, 2011 and No. 2012-108679 filed May 10, 2012, which are hereby incorporated by reference herein in their entirety.

What is claimed is:

1. An imaging apparatus comprising:
  a display unit configured to display a focusing frame;
  a light metering unit on which light is incident;
  a detection unit configured to detect a predetermined object from an image signal obtained by the light metering unit; and
  a processing unit configured to select at least one of a plurality of focusing frames displayable by the display unit according to a result of detection by the detection unit, and to cause the display unit to display the selected focusing frame,
  wherein the light is incident on the light metering unit after the light is transmitted though the display unit, and
  wherein the processing unit moves a position of a focusing frame to be displayed by the display unit to a position corresponding to the detected object if a ratio of a size of the detected object to a size of the focusing frame displayed on the display unit is greater than or equal to a predetermined threshold and the position of the focusing frame displayed by the display unit doesn't correspond to the position corresponding to the detected object, and does not move the position of the focusing frame to be displayed by the display unit to a position corresponding to the detected object if the ratio is less than the threshold and the position of the focusing frame displayed by the display unit doesn't correspond to the position corresponding to the detected object.

2. The imaging apparatus according to claim 1, wherein the processing unit changes the threshold between when the focusing frame is not displayed on the display unit and when the focusing frame is displayed on the display unit.

3. The imaging apparatus according to claim 1, wherein the processing unit moves the position of the focusing frame to be displayed by the display unit to a position corresponding to the object if the ratio of the size of the detected object to the size of the focusing frame displayed on the display unit is greater than or equal to the threshold and the detected object lies in a position within a predetermined range from the position of the currently-selected focusing frame.

4. The imaging apparatus according to claim 3, wherein the processing unit sets the predetermined range according to the size of the detected object.

5. The imaging apparatus according to claim 1, wherein the detection unit performs tracking processing of extracting an area highly correlative with an image signal of a position indicated by a focusing frame from another image signal, and
  wherein the processing unit moves the position of the focusing frame to be displayed by the display unit to a position corresponding to the area extracted by the tracking processing if the ratio of the size of the detected object to the size of the focusing frame displayed on the display unit is less than the threshold and the position of the focusing frame displayed by the display unit doesn't correspond to the position corresponding to the detected object.

6. A method for controlling an imaging apparatus including a display unit configured to display a focusing frame, the method comprising:
  detecting a predetermined object from an image signal obtained by a light metering unit on which light is incident, wherein the light is incident on the light metering unit after the light is transmitted though the display unit;
  determining whether a ratio of a size of the object to a size of the focusing frame is greater than or equal to a predetermined threshold; and
  moving a position of a focusing frame to be displayed by the display unit to a position corresponding to the object if the ratio of the size of the object to the size of the focusing frame is greater than or equal to the threshold and the position of the focusing frame displayed by the display unit doesn't correspond to the position corresponding to the detected object, and not moving the position of the focusing frame to be displayed by the display unit to a position corresponding to the object if the ratio is less than the threshold and the position of the focusing frame displayed by the display unit doesn't correspond to the position corresponding to the detected object.

7. A computer-readable non-transitory storage medium storing a program for controlling an imaging apparatus including a display unit configured to display a focusing frame, the program causing a computer of the imaging apparatus to perform a method comprising:
  detecting a predetermined object from an image signal obtained by a light metering unit on which light is incident, wherein the light is incident on the light metering unit after the light is transmitted though the display unit;
  determining whether a ratio of a size of the object to a size of the focusing frame is greater than or equal to a predetermined threshold; and
  moving a position of a focusing frame to be displayed by the display unit to a position corresponding to the object if the ratio of the size of the object to the size of the focusing frame is greater than or equal to the threshold and the position of the focusing frame displayed by the display unit doesn't correspond to the position corresponding to the detected object, and not moving the position of the focusing frame to be displayed by the display unit to a position corresponding to the object if the ratio is less than the threshold and the position of the focusing frame displayed by the display unit doesn't correspond to the position corresponding to the detected object.

* * * * *